United States Patent
Strobel

(10) Patent No.: US 9,686,035 B2
(45) Date of Patent: Jun. 20, 2017

(54) SPECTRUM MANAGEMENT AND TIMING OPTIMIZATION OVER MULTIPLE DISTRIBUTION POINTS

(71) Applicant: Lantiq Deutschland GmbH, Neubiberg (DE)

(72) Inventor: Rainer Strobel, Munich (DE)

(73) Assignee: Lantiq Deutschland GmbH, Neubiberg (DE)

(*) Notice: Subject to any disclaimer, the term of this patent is extended or adjusted under 35 U.S.C. 154(b) by 19 days.

(21) Appl. No.: 13/949,188

(22) Filed: Jul. 23, 2013

(65) Prior Publication Data
US 2014/0056312 A1  Feb. 27, 2014

(30) Foreign Application Priority Data
Jul. 23, 2012  (EP) .................... 12005357

(51) Int. Cl.
| | | |
|---|---|---|
| H04L 12/43 | (2006.01) | |
| H04J 3/10 | (2006.01) | |
| H04J 3/06 | (2006.01) | |
| H04L 5/00 | (2006.01) | |

(52) U.S. Cl.
CPC .............. *H04J 3/10* (2013.01); *H04J 3/0647* (2013.01); *H04J 3/0658* (2013.01); *H04J 3/0682* (2013.01); *H04L 5/0053* (2013.01); *H04J 2203/0067* (2013.01)

(58) Field of Classification Search
None
See application file for complete search history.

(56) References Cited

U.S. PATENT DOCUMENTS

| | | | | |
|---|---|---|---|---|
| 6,275,990 B1* | 8/2001 | Dapper | .................. | G06F 17/14 |
| | | | | 348/E7.07 |
| 6,731,707 B1 | 5/2004 | Olofsson et al. | | |
| 6,792,101 B2 | 9/2004 | Peeters et al. | | |
| 2002/0021686 A1* | 2/2002 | Ozluturk et al. | ............. | 370/342 |
| 2007/0116467 A1* | 5/2007 | Kwon et al. | .................... | 398/72 |

(Continued)

FOREIGN PATENT DOCUMENTS

EP   1164730 A1 * 12/2001   ................ H04J 3/06

OTHER PUBLICATIONS

Series G: Transmission Systems and Media, Digital Systems and Networks. Digital sections and digital line system—Optical line systems for local and access networks. ITU-T Telecommunication Standardization Sector of ITU. G.984.3, Amendment 1. Jul. 2005. 46 pages.

(Continued)

*Primary Examiner* — Otis L Thompson, Jr.
(74) *Attorney, Agent, or Firm* — Eschweiler & Potashnik, LLC

(57) ABSTRACT

Presented are systems and methods for spectrum management and timing optimization of communication networks have multiple distribution points, multiple remote transceivers, and a shared communication binder. In some embodiments, distribution points and communication lines are added to an active network by the allocation of unused time slots. In some embodiments, transmission collisions, near-end cross-talk, and far-end cross-talk, are predicted upon the addition of added distribution points and communication lines, and techniques are applied to reduce or cancel such phenomena.

15 Claims, 10 Drawing Sheets

(56) References Cited

U.S. PATENT DOCUMENTS

| | | | |
|---|---|---|---|
| 2009/0080891 A1* | 3/2009 | Kazawa et al. ................. | 398/79 |
| 2009/0175156 A1* | 7/2009 | Xu ................................ | 370/201 |
| 2009/0296865 A1* | 12/2009 | Ashikhmin ............... | H04L 5/14 |
| | | | 375/358 |
| 2010/0046738 A1* | 2/2010 | Schelstraete et al. ... | 379/406.01 |
| 2010/0098433 A1* | 4/2010 | Boyd et al. .................... | 398/155 |
| 2010/0104287 A1* | 4/2010 | Biegert et al. ................. | 398/67 |
| 2010/0195817 A1* | 8/2010 | Cendrillon et al. ..... | 379/406.06 |
| 2010/0254464 A1* | 10/2010 | Schnitter et al. ............. | 375/257 |
| 2011/0007788 A1* | 1/2011 | Cendrillon et al. .......... | 375/222 |
| 2012/0076183 A1* | 3/2012 | Dapper ............... | H03M 13/356 |
| | | | 375/219 |
| 2012/0099854 A1* | 4/2012 | Fourcand ....................... | 398/25 |
| 2013/0107917 A1* | 5/2013 | Gupta ............................ | 375/219 |
| 2013/0215951 A1* | 8/2013 | Nuzman ....................... | 375/227 |
| 2013/0229905 A1* | 9/2013 | Schenk et al. ................ | 370/201 |
| 2013/0272177 A1* | 10/2013 | Wei et al. ..................... | 370/294 |
| 2013/0294597 A1* | 11/2013 | Shi et al. ................. | 379/406.01 |
| 2014/0023048 A1* | 1/2014 | Vu ........................... | H04B 7/26 |
| | | | 370/336 |
| 2014/0029406 A1* | 1/2014 | Liang et al. ................... | 370/201 |
| 2014/0056583 A1* | 2/2014 | Giddings et al. .............. | 398/44 |
| 2014/0105314 A1* | 4/2014 | Liu et al. ...................... | 375/257 |
| 2014/0140187 A1* | 5/2014 | Wang et al. .................. | 370/201 |
| 2014/0186039 A1* | 7/2014 | Luo et al. ...................... | 398/66 |

OTHER PUBLICATIONS

Extended European Search Report, Dated Feb. 13, 2015, Application No. 12005357.4-1860.

* cited by examiner

SPECTRUM MANAGEMENT AND TIMING OPTIMIZATION OVER MULTIPLE DISTRIBUTION POINTS

This Application claims priority benefit of European Patent Application number 12 005 357.4, which was filed on Jul. 23, 2012. The entire contents of the European Patent Application Number 12 005 357.4 are incorporated herein by reference.

Many communication systems are structured such that multiple customer premises equipment ("CPE") transceivers are in communicative contact with a single central office. In such systems, all of the CPE transceivers will communicate through a single binder, communication channels coming out of the binder will be distributed among two or more distribution points ("DPs"), and each DP is communicatively connected to the same central office. In essence, there are physical links between a central office and remote customer sites, such as homes, office, or other locations that include CPE. The physical link connecting the central location and remote locations may be wireline of any kind, or wireless of any kind.

Such systems provide a variety of communication services. The provision of relatively new services, such as IPTV ("Internet protocol television") or cloud computing, requires increasing communication bandwidth from what is available in the prior art. There are significant costs associated with increasing the bandwidth to allow the new services. One technical problem that decreases bandwidth and inhibits the provision of additional bandwidth, is crosstalk between lines sharing the binder. There are techniques used to decrease crosstalk, and hence to increase bandwidth, for channels that are located within a single DP. Such techniques include, for example, vector pre-coding within a single DP, and equalization within a single DP. However, the ability to decrease crosstalk throughout the system is limited if the only actions taken affect solely the lines within a single DP. Another technical problem that decreases bandwidth and inhibits the provision of additional bandwidth, is communication collisions between upstream and downstream transmissions occurring on the same physical link at the same time.

It would be useful and novel to have systems and methods for coordinating communication between the multiple DPs, thereby enhancing communication bandwidth for the entire system. Such coordination could occur upon system setup, upon addition of a new communication device or communication line, or periodically according to either an event or a time horizon. All communication systems, including both wireline and wireless systems, may suffer various kinds of interference, which enhances the need for system-wide coordination. Wireless systems, in particular, suffer rapidly changing interference, which increases the need for adaptive coordination on a system-wide basis.

For all communication systems, including both wireline and wireless systems, efficient use of potential channel capacity requires that communication be coordinated system-wide, and particularly for different lines that share a central and office and a communication binder, but which are distributed among two or more distribution points. Multiple techniques may be used, in multiple embodiments, in combination or alternatively, in order to enhance system-wide bandwidth.

One such technique is "spectrum optimization", in which spectrum is allocated by a central optimizer to the multiple distribution points. Spectrum may be optimized, according to alternative embodiments, upon system setup, upon the addition or deletion of a communication line or distribution point, according to certain time limits, or in reaction to specific events which may be pre-defined or which may become optimizing events when they occur.

A second such technique is allocation of transmit and receive time slots to specific distribution points, or to specific communication lines within two or more different distribution points.

The techniques used for system-wide optimization, such as spectrum management and timing optimization involving two or more distribution points, may be used together with the techniques employed within a single distribution point, such as local crosstalk cancellation by vector pre-coding and local crosstalk cancellation by equalization of lines within a single distribution point. The combination of system-wide techniques and local techniques may have a significant effect on increasing system bandwidth.

Some embodiments described herein set forth a communication system that includes a central office, a central optimizer, multiple distribution points, a binder, multiple CPE transceivers, and communication links between the central office and the CPE transceivers. In some embodiments, a central optimizer coordinates spectrum management among the DPs, and allocates transmission and reception time slots among the DPs. In some alternative embodiments, the central optimizer is located at a central office. In other embodiments, the central optimizer is located at one of the DPs.

In one embodiment, there is a system for electronic communication, including an optimizer, two or more distribution points each of which is communicatively connected to the optimizer, a communication binder, a plurality of remote transceivers, and a plurality of communication lines between the distribution points and the remote transceivers. In one embodiment, the communication lines are configured such that each distribution point is communicatively connected to at least one communication line, all lines run through the communication binder, all lines terminate at a remote transceiver, and each remote transceiver is communicatively connected to at least one line. In one embodiment, the system is configured solve a communication problem associated with communication collision or crosstalk.

In some embodiments, there are methods for synchronizing the multiple DPs. The central optimizer creates a common clock for the multiple DPs. The central optimizer also estimates the delays of communications to and from the central office from and to each DP, and also to and from each DP from and to each CPE transceiver. Based on these estimates, in some embodiments the central optimizer allocates spectrum among the various DPs, and in alternative embodiments, the central optimizer allocates transmit and receive time slots among the various DPs, or alternatively, among different communication lines that go through different DPs. In some embodiments, estimates are used to align symbol timing. In some embodiments, spectrum is allocated among either DPs or among different communication lines that go through different DPs. In some alternative embodiments, the central optimizer is located at a central office. In other embodiments, the central optimizer is located atone of the DPs. In some embodiments, estimates are used to allocate spectrum among the uplink and downlink channels, while in other embodiments the estimates are used to align symbol timing between uplink and downlink channels, while in additional other embodiments the estimates are used to allocate transmit and receive time slots between uplink and downlink channels.

One embodiment is a method of synchronizing communication in an electronic communication system. In one embodiment, the method includes the steps of an optimizer create a common clock for multiple distribution points sharing a communication binder, the optimizer estimates time delays of a communication path from a central unit to the distribution points, and the optimizer uses the estimated time delays to align symbol timing of transmissions to and from the distribution points.

In some embodiments, there are methods for initializing a distribution point and adding the distribution point to the active system in a "line joining" (1) The DP is initialized, in that resources for joining new line are pre-allocated with respect to the expected crosstalk that may be caused by the training of the new lines that run through the added DP. Pre-allocation of resources are typically done by creating a channel for channel estimation which is orthogonal to the active channels or by increasing the robustness of active channels by using more robust channel settings. (2) Communication path delays are estimated with the assumption that the DP has been added to the active system. In particular, resources are pre-allocated based on either initial channel estimation (which may be upstream channel estimation, but is more typically downstream estimation) or without channel estimation by choosing sufficient communication chain margin for the active lines, by increasing transmission overhead used for forward error correction, or by using a separate time slot for the uplink training sequence and management channel. (3) The DP is line joined to the system. Initial resources are allocated for data transmissions, although it is understood that estimates of vector pre-coding and equalizer initialization may be imperfect. (4) The DP becomes active, and the system operates, including the added DP.

One embodiment is a method for initializing an added distribution point in an electronic communication system. In one embodiment, the method includes allocating resources for downstream management, upstream management, and channel estimation, training of lines for data transmission, and initializing pre-coders and equalizers from channel estimation.

The independent claims define the invention in various aspects. The dependent claims define embodiments of the invention in the various aspects.

In a first aspect the invention encompasses a method of synchronizing communication in an electronic communication system with a central unit and multiple distribution points sharing a communication binder, the method comprising the steps: creating a common clock for the multiple distribution points; estimating time delay of a communication path from the central unit to the distribution points; and using the estimated time delays to align symbol timing of transmissions to and from the distribution points. An embodiment of the method according to the invention in the first aspect further comprises the step estimating timing advances to align timing of upstream transmissions in the system with timing of downstream transmissions in the system. An embodiment of the method according to the invention in the first aspect further comprises the step using the estimated time delays and/or estimated timing advances to avoid communication collisions in the system. An embodiment of the method according to the invention in the first aspect further comprises the step using the estimated time delays and/or estimated timing advances to avoid near-end crosstalk in the system. An embodiment of the method according to the invention in the first aspect further comprises the step applying far-end crosstalk cancellation techniques to compensate for far-end crosstalk.

In a second aspect the invention encompasses a method for adding an added distribution point in an electronic communication system with a central unit and multiple distribution points. The method comprises the steps allocating resources in the added distribution point for downstream management, upstream management, and channel estimation; training of lines connected to the added distribution point for data transmission; initializing pre-coders and equalizers in the distribution point from channel estimation; and one or more steps of the method according to the invention in the first aspect. In an embodiment of the method according to the invention in the second aspect the adding encompasses initializing the added distribution point. In an embodiment of the method according to the invention in the second aspect the steps of adding the added distribution point form part of initializing the added distribution point. In an embodiment of the method according to the invention in the second aspect allocating of resources for downstream management, upstream management and channel estimation comprises estimating collisions and crosstalk from actively joining upstream transmissions resulting from the addition of communication lines within the added distribution point; predicting collisions and crosstalk from actively joining downstream transmissions resulting from the addition of communication lines within the added distribution point; allocating resources for downstream management and channel estimation; and/or allocating resources for upstream management and channel estimation. In an embodiment of the method according to the invention in the second aspect the training of lines for data transmission comprises performing timing recovery and initialization of CPE transceivers included as part of the system; completing channel estimation; and performing initial resource allocation for data transmission.

In a third aspect the invention encompasses a system for electronic communication. The system comprises an optimizer; a plurality of distribution points, each of which is communicatively connected to the optimizer; a communication binder; a plurality of remote transceivers; and a plurality of communication lines between the distribution points and the remote transceivers. The distribution points are configured such that the distribution point is communicatively connected to at least one communication line, all lines run through the communication binder, all lines terminate at a remote transceiver, and the remote transceiver is communicatively connected to at least one line. In an embodiment the system is configured to perform one or more steps of the method according to the invention in the second aspect. At least one effect of the invention is to reduce a communication problem associated with communication collision or crosstalk.

In a fourth aspect the invention encompasses an optimizer for use in a system according to the invention in the third aspect. The optimizer is adapted for communicative connection to a plurality of distribution points. In an embodiment according to the invention in the fourth aspect the optimizer is provided as a central optimizer configured for location at a central office. In an embodiment according to the invention in the fourth aspect the optimizer is provided as a master optimizer configured for location at a distribution point.

In an embodiment according to the invention in the fourth aspect the optimizer is adapted to timing advances of one or more transmissions. In an embodiment according to the invention in the fourth aspect the optimizer is adapted to synchronization of transmissions such that each of two or more transmitters transmit a transmission at substantially the same time. At least one effect of the aforementioned embodiments can be less collisions.

In an embodiment according to the invention in the fourth aspect the optimizer is adapted to allocate transmission slots to the new lines, such that the allocated transmission slots were not in use prior to the addition of the new distribution point. At least one effect can be improved timesharing.

In an embodiment according to the invention in the fourth aspect the optimizer is adapted to use review of data about transmissions and receptions prior to the addition of the new lines to the system. In an embodiment according to the invention in the fourth aspect the optimizer is adapted to estimate where near-end crosstalk will occur, and to use the estimates to prevent such near-end. At least one effect of the aforementioned embodiments can be less near-end crosstalk.

In an embodiment according to the invention in the fourth aspect the optimizer is adapted to estimate where far-end crosstalk will occur and use estimates to prevent such far-end crosstalk. In an embodiment according to the invention in the fourth aspect the optimizer is adapted to cancel far-end cross talk. At least one effect of the aforementioned embodiments can be less far-end crosstalk In an embodiment according to the invention in the fourth aspect the optimizer is configured to perform one or more steps of the method according to the invention in the second aspect.

Various embodiments are not restricted or constrained by the physical channel on which data is conveyed. Therefore, various embodiments are cable, while other embodiments are wireline telephone or other wireline communication, and other embodiments are wireless.

Various embodiments are not restricted or constrained by the manner in which a system or owned or operated. Therefore, various embodiments may be entirely owned and operated by a single entity. In some embodiments, a system is entirely privately owned. In some embodiments, a system is entirely publicly owned, in the sense that the equipment is owned by one party which offers services to one or more other parties. In some embodiments, the system involves a split of ownership or operation, in which, for example, a central office and distribution points are owned and operated by one party, whereas CPE devices are owned and operated by one or more other parties.

The embodiments are herein described, by way of example only, with reference to the accompanying drawings. No attempt is made to show structural details of the embodiments in more detail than is necessary for a fundamental understanding of the embodiments. In the drawings.

Figure 1:
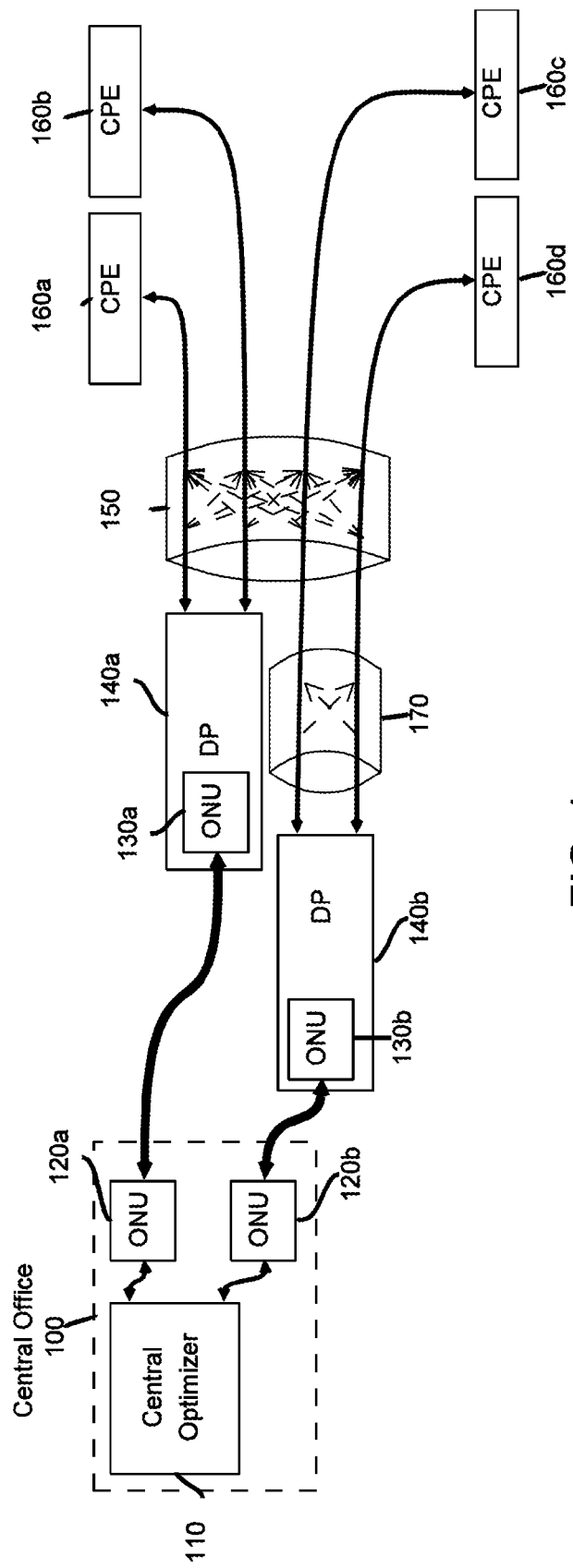
FIG. 1 illustrates one embodiment of a transmission communication system with multiple distribution points.

In this description, the following abbreviations have the indicated meanings:

ABBREVIATIONS

CO: "Central office". This is the point in the system that receives communication from the CPE transceivers, and the point from which communication is sent to the CPE transceivers. The CO includes at least two ONUs. The CO includes a central optimizer in some embodiments, although in other embodiments the central optimizer is included as part of a DP. In this document, the abbreviation "CO" refers only to "central office" and never refers to "central optimizer".

CPE: "Customer premises equipment". Communication devices located at a subscriber site. Computer hardware devices, such as personal computers or local servers serving a particular site, are examples of CPE devices. Wireless units conducting wireless communication for transmission, reception, or both, are other examples. Wireline units conducting wireline communication for transmission, or reception, or both, are other examples. Such wireline units may be communicatively connected to the communication backbone by copper wires, cable, or other physical media. "CPE" is often referenced as "CPE transceivers", meaning CPE devices that can both transmit and receive electronic communication.

DP: "Distribution point". This is a physical device in a communication system through which will pass a number of communication lines to and from CPE transceivers from and to a central office.

ONU: "Optical network unit". In one embodiment, the system is a optical network. The ONU in a DP is in communicative contact with the ONU at the central office. The invention is not limited to optical networks, and may be a wireline network of any kind (such as, by example but not by limitation, copper wire pairs or cable lines) or a wireless network of any kind (such as, by example but not by limitation, a point to point or point to multipoint terrestrial network, or a satellite network).

PSD: "Power spectral density". This is a function that shows the average strength of transmission power per frequency (measured in Watts per Hertz). It shows at which frequencies transmissions are strong and at which frequencies transmissions are weak.

SNR: "Signal to noise ratio". The noise may be environmental noise, transmission channel noise (as say, for example, thermal noise caused by the power amplifier), another data transmission or interference, or other noise.

TDD: "Time division duplexing". This is a specific kind of time division multiplexing in which the multiplexing is between uplink and downlink transmissions. TDD might be, but is not limited to, multiplexing on a single communication path, in which case full duplex communication is emulated on this one path. In alternative embodiments, multiple lines are subjected to TDD, so that much or all of the entire system is subjected to TDD planned by the central optimizer.

TDM: "Time division multiplexing". This is a multiplexing scheme in which two or more bit streams share a physical channel. The TDM may involve multiple uplink transmissions, or multiple downlink transmissions, or a mix of uplink and downlink transmissions (and in the latter case, it is called "TDD" if there is one uplink transmission stream and one downlink transmission stream, for the physical channel).

In this description, the following terms have the indicated meanings:

"Collision" is a phenomenon in which there is both upstream and downstream transmission on the same physical communication line, at the same time. Such a phenomenon can cause loss of data, and should be avoided.

"CPE transceivers" are remote transceivers. These are generally located at the office or home of a consumer or customer, hence the name "CPE", short for "customer premises equipment". However, these transceivers need not be owned by a consumer or customer, and in fact may be owned by the same party that owns the central office. For that reason, "CPE transceiver" includes all remote transceivers, whether owned by a customer or not. Similarly, the acronym "CPE" may be used, and the meaning is "CPE transceiver" as defined here.

"Downlink" is exactly the same as "downstream".

"Downstream" is a communication from a central point, or central server, or communications center, or central office, in the direction of remote CPE transceivers. "Downstream" may also be a communication from a distribution point in the direction of a CPE transceiver.

"Estimating a problem" or "estimating a communication problem" is measuring a problem that may arise in a communication line, such as collision, near-end crosstalk, or far-end crosstalk.

"Far-end crosstalk" is the crosstalk resulting when two communication lines sharing a binder are transmitting in the same direction (that is, either both upstream or both downstream) at the same time. Such a phenomenon can cause loss of data, and should either be avoided, or should be compensated for with cross-talk canceling and other communication techniques.

"Global system optimization" is the optimization of the communication system which is performed by the central optimizer. It includes either spectrum management among the DPs (or among lines passing through different DPs), or allocation of transmit and receive time slots among the DPs (or among lines passing through different DPs).

"Initialization" is the process by which a DP, whether a new DP or a DP returning to on-line status, is made ready to be added to the system. Initialization includes synchronizing the DP to be added with the already active DPs, and estimating communication delays after the added DP is joined to the system. After initialization, the DP is line joined to the system.

"Line joining" is the process of adding a DP to the active communication system. In some embodiments, the added DP is completely new to the system. That may occur, for example, when new communication lines are added to the system, and such communication lines pass through the new DP. Alternatively, that may occur if the communication lines are not new, but if the system is reorganized to have different lines passing through different DPs, including through the new DP. In some embodiments, the added DP is not completely new to the system, but has been off-line (that is, inactive), for some reason and for some period of time. Whether the added DP is new or coming back onto the system, it must be "line joined" to be active on the system.

"Local optimization" includes the processes by which communication is optimized among the lines that pass through a single DP. The optimization is done at the single DP, and may include local crosstalk cancellation by vector pre-coding, or line equalization, or both of vector pre-coding and line equalization. Techniques of local optimization may be combined with global system optimization to enhance system bandwidth.

"Near-end crosstalk" is the crosstalk resulting when two communication lines sharing a binder are transmitting in opposite directions (that is, either upstream and downstream, respectively, or downstream and upstream, respectively) at the same time. Such a phenomenon can cause loss of data, and should be avoided.

"Orthogonal" is an adjective meaning "unrelated or uncorrelated". It appears in a variety of contexts here. "Orthogonal access" means that two or more devices will communicate on a line, but neither device transmits in a manner that will interfere substantially with transmission of another device. An "orthogonal access scheme" is a plan in which two or more devices will communication on shared physical channels, but in such a manner that no transmission interferes substantially with any other transmission. An "orthogonal channel" is a physical communication channel that is shared by two or more devices, but in such a manner that the transmissions of a device do not interfere substantially with the transmissions of the other devices. Similarly, an "orthogonal channel estimation" is an estimation by the central optimizer that certain parameters, including at least spectrum management or timing optimization, will make the channel substantially orthogonal for a specified group of transmitting devices over a particular period of time. "Orthogonal sequence" is transmissions by a device in such a manner that the transmissions do not substantially interfere with the transmissions of other devices. Any modulation scheme that permits this kind of non-interfering transmissions by multiple transmitters, would be an acceptable transmission. Examples are Frequency Division Multiple Access ("FDMA"), Time Division Multiple Access ("TDMA"), Code Division Multiple Access ("CDMA"), or any combination of these.

"Predicting a problem" or "predicting a communication problem" is calculating, but without measurement, a problem that may arise in a communication line, such as collision, near-end crosstalk, or far-end crosstalk.

"Showtime" is the state of active data transmission after finishing initialization.

"Spectrum management" is a process of adjusting transmission settings of various lines, transmit spectrum allocation to various lines, and vector and pre-coding and line equalization settings. The adjustment of transmission settings and transmit spectrum allocation are novelties described herein. "Spectrum management" may also be referenced as "inner optimization" of the system.

"Spectrum optimization" is a combination of the two techniques of "spectrum management" and "timing optimization".

"Timing advance" is a technique in which the beginning of transmission of a data packet is moved up in time in order to prevent a communication problem. Generally, the system estimates that there will be a communication problem without the timing advance, calculates the length of the advance required to avoid the problem, and executes the advance by having transmission of the data begin earlier than it would have without the timing advance.

"Timing optimization" is a process by which the central optimizer adjusts groups of communication lines transmitting at the same time, and the allocates transmission times among uplink and downlink transmissions contained in the media access plan. The medium access plan is optimized dynamically with respect to the rate requirements from the active connections. The information required to run the optimization are the actual link qualities which were achieved when all DPs use a specific configuration and the quality of service requirements from the subscribers. "Timing optimization" may also be referenced as "outer optimization" of the system.

"Training a line" or "line training" is the process of measuring or calculating communication problems that may arise on a communication line, such as collision, near-end crosstalk, and far-end crosstalk, and calculating actions that could avoid or reduce any such problems. This may include "estimating" a problem, or "predicting" a problem, or both.

"Uplink" is exactly the same as "upstream".

"Upstream" is a communication from a remote CPE transceiver or from a distribution point, in the direction of a central point, or central server, or communications center, or central office.

"Wireline communication" includes communication by cable, by a pair or greater number of telephony lines bound together, or by any other communication that includes communication by cable or wire. A "wireline" is a line that is cable, wireline telephony, or any other kind of wired structure for communication. A "wireline communication" or "wireline connection" is the path by which wireline communication occurs.

"Wireless communication" includes communication by wireless, which may be terrestrial or satellite, cellular or land mobile, microwave or sub-microwave, or any other kind of wireless communication. A "wireless communication" or "wireless connection" is the path by which wireless communication occurs.

"Hybrid communication system" is a system that includes at least one wireline connection between two or more wireline communication units, and also at least one wireless connection between two or more wireless communication units. The description herein includes, in various embodiments, systems that are hybrid communication systems.

"Forward error correction" is a method to control errors in data transmission by adding redundancy at the transmitter which enables the receiver to detect and correct transmission errors.

FIG. 1 illustrates one embodiment of transmission system with multiple distribution points. There is a central office 100, comprising a central optimizer 110 and one or more optical network units 120a and 120b. The central optimizer 110 optimizes communication between the central office 100 and downstream components of the system. The ONU units 120a and 120b in the central office 100 are in direct communication, over an optical connection that is typically a fiberoptic cable, with both the central optimizer 110 and downstream ONU units 130a and 130b. Downstream communication from the central office 110 may flow in multiple paths. According to one path, communication flows from the central office 110, to an ONU 120a, to a downstream ONU 130a, where 130a is part of a distribution point 140a, that is connected through a crosstalk channel 150 with CPE transceiver equipment 160a and 160b. The link between the DP 140a and the CPE equipment 160a and 160b may be wireline or wireless, but is typically, although not exclusively, copper wire. Upstream communication travels in exactly the opposite path, from CPE transceiver equipment 160a and 160b through crosstalk channel 150, to DP 140a, to ONU 130a, over typically fiberoptic cable to ONU 120a, and finally to the central optimizer 110 in the central office 100.

According to a second communication path, communication flows from the central office 110, to an ONU 120b, to a downstream ONU 130b, where 1130b is part of a distribution point 140b, that is connection through a crosstalk channel 170 serving lines only from that particular DP 140b. Communication then flows from crosstalk channel 170 to the crosstalk channel 150 serving multiple distribution points, then to CPE equipment 160c and 160d. The link between the DP 140b and crosstalk channel 170 may be wireline or wireless, but is typically, although not exclusively, copper wire. The link between crosstalk channel 170 and the CPE equipment 160c and 160d may be wireline or wireless, but is typically, although not exclusively, copper wire. Upstream communication travels in exactly the opposite path, from CPE equipment 160c and 160D through crosstalk channel 150, to crosstalk channel 170, to DP 140b, to ONU 130b, over typically fiberoptic cable to ONU 120b, and finally to the central optimizer 110 in the central office 100.

These are not the only possible communication system structures. Another non-limiting example of such a structure would be only the first communication path, where one crosstalk channel services all the lines. Hence, the system would be comprised of 100, 110, 120a, 130a, 140a, 150, and 160a and 160b. Another non-limiting example of such a structure would be where there is no crosstalk channel for a single DP, hence, exactly structure shown in FIG. 1, except without crosstalk channel 170.

As shown in FIG. 1, some embodiments show access network topology consisting of small distribution points (DPs) which are connected to a backbone via fiberoptic cable. Each distribution point may serve a fixed number of subscribers, such as 8 or 16 subscribers, over the last mile between the DP and customer premises, typically, although not exclusively, over copper wires.

Although the description herein references, at different points, a fiber optic cable, a wireline path, and a wireless path, it will be understood that the entire system can be comprised of only one medium, be it fiber optic, wireline, or wireless. If the system is a hybrid communication system, it may be as described in FIG. 1, or it may be any other combination of fiber optic, wireline, and wireless links.

Either the crosstalk channel 150, or the crosstalk channel 170, or both, may be a cable binder, although that is not essential. In whatever manner the different lines are bound together at points 150 and 170, there is a potential for cross talk between and among the different lines.

With increasing bandwidth requirements, small distribution points are used to serve a small number of customers via a short twisted pair copper line. The distribution points are connected to via fiber to a higher level network element, e.g., the central office.

To increase performance, vector pre-coding and equalization may be used to reduce crosstalk effects. For vectoring, the vectoring processor must have all transmit (pre-coder) and receive (equalizer) signals available. This is most practical within one distribution point, because with multiple DPs the physical signal data must be exchanged between the DPs.

On the other hand, for orthogonal access schemes and spectrum management, the amount of data that has to be exchanged between the distribution points is manageable. Partly for that reason, some embodiments propose to execute spectrum optimization and allocation of transmit and receive time slots from a central optimizer over multiple distribution points which share the same cable binder.

This approach, that is, the activity of the central optimizer, may be combined with local crosstalk cancellation by vector pre-coding and by equalization within the distribution points. The combination of crosstalk cancellation, spectrum management, and timing optimization, increases the performance of crosstalk cancellation for systems with multiple distribution points which share one cable binder.

Figure 2:
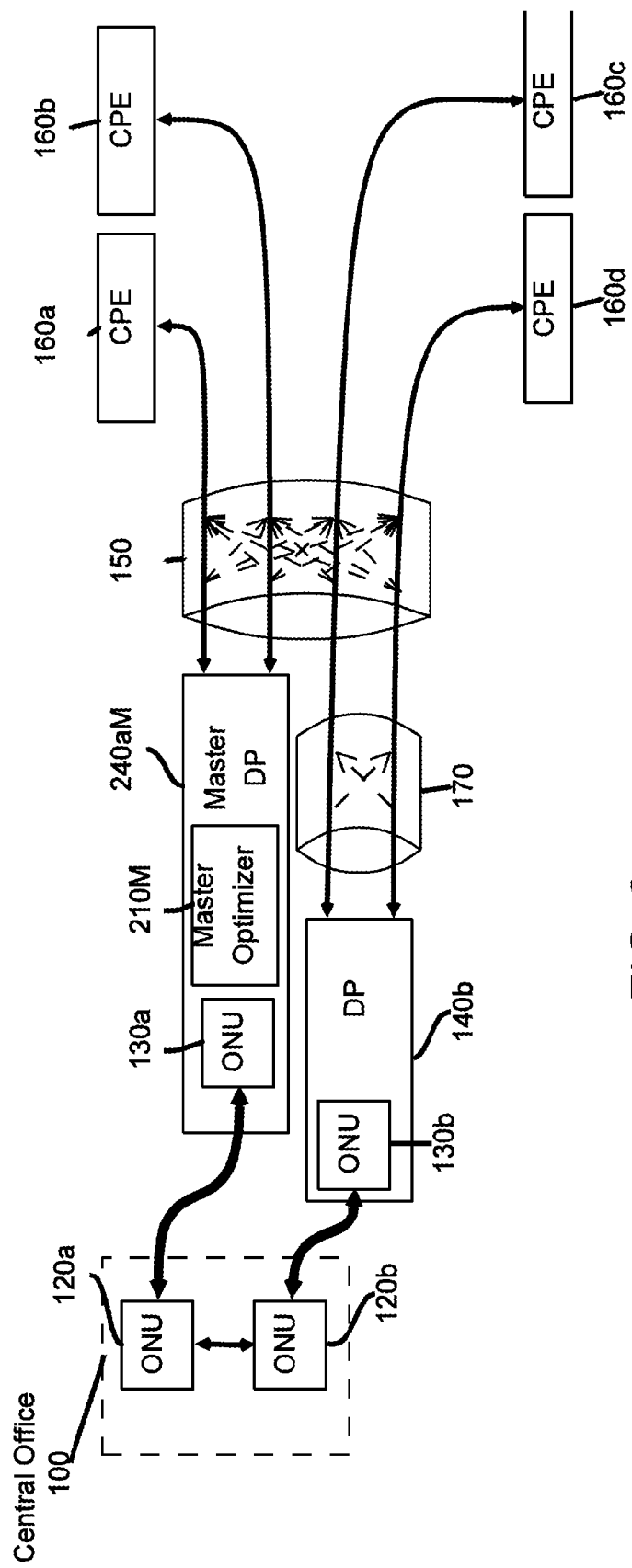
FIG. 2 illustrates an alternative embodiment of a transmission communication system with multiple distribution points.

FIG. 2 illustrates alternative one embodiment of transmission system with multiple distribution points. The system in FIG. 2 is much the same as the system in FIG. 1, with one important difference. The system in FIG. 1 included the central optimizer 110 within the central office 100. By contrast, in FIG. 2 there is no optimizer in the central office 100, but rather there is a master optimizer 210M, which is now located in and part of a master DP 240aM. In essence, the optimizer has moved from being a central optimizer 110 in FIG. 1 to a master optimizer 210M in FIG. 2. The functioning is much the same. Throughout this written description and the claims, any reference to or description of a "central optimizer 110" in FIG. 1 is understood to include also the alternative structure of a master optimizer 210M located within a master DP 240aM in FIG. 2.

In various embodiments, the overall spectrum of multiple distribution points sharing the same binder 150 is optimized at an optimizer which is located as a master optimizer 210M within one of the distribution points that has become a master DP 240aM, or as a central optimizer 110 at a higher level in the system, that is, within the central office 100.

In various embodiments, up to three exemplary methods for crosstalk reduction may be applied and combined in a preferred way. That is, any one of the three may be applied, or any two of the methods may be applied, or all three of the methods may be applied.

In one exemplary method, there is strong crosstalk between some lines of the binder, and such crosstalk cannot be cancelled because the lines belong to different distribution points or because of other constraints. By this method, the crosstalk between or among the lines in the binder is compensated by orthogonal access using time division multiplexing.

In a second exemplary method, there is weaker crosstalk between or among lines in the binder. Here, it is beneficial to serve multiple lines at the same time, and the crosstalk may be minimized by joint spectrum optimization.

In a third exemplary method, there is crosstalk between and among the lines of one distribution point. For this crosstalk, vector pre-coding, or line equalization, or both, may be applied. This method is not part of the current invention, but it may be combined with various embodiments to create a stronger effect on increasing system bandwidth.

The decision as to which method or which methods to apply, is typically done dynamically within a central optimizer. Various considerations may be relevant to the decision, including, by way of example but not by way of limitation, the rate requirements of the users of the CPE transceivers, and also the communication quality requirements of the same users.

The amount of data required to perform the global system optimization and communicate the result to the different transmission elements, is relatively low in comparison to the data rates of the transmission links. Therefore, optimization routines in various embodiments need not be restricted to use within a single distribution point. Rather, it is possible to have a higher level control unit, e.g., a central optimizer 110 in the central office 120 (or, as always, a master optimizer 210M) which performs the optimization for multiple distribution points, and communicates the results back to the distribution points. Various embodiments are particularly beneficial for cases where multiple distribution points use transmission lines within the same binder 150 such that there is crosstalk between the lines of different distribution points.

The transceivers locally search for the optimal configuration for the parameters that are locally available. The overall optimization with respect to a system-wide criterion is done by a linear combination of the locally optimal settings. In some embodiments, the overall optimization is achieved by switching between or among multiple locally optimal configurations. Therefore, all CPE transceivers must be able to store multiple configurations and synchronously switch between the different configurations. Algorithms which can be used to compute the transmit time slots and transmission settings for local searching are not part of the current invention, but may be used with various embodiments to enhance the increase in system-wide bandwidth.

Figure 3A:
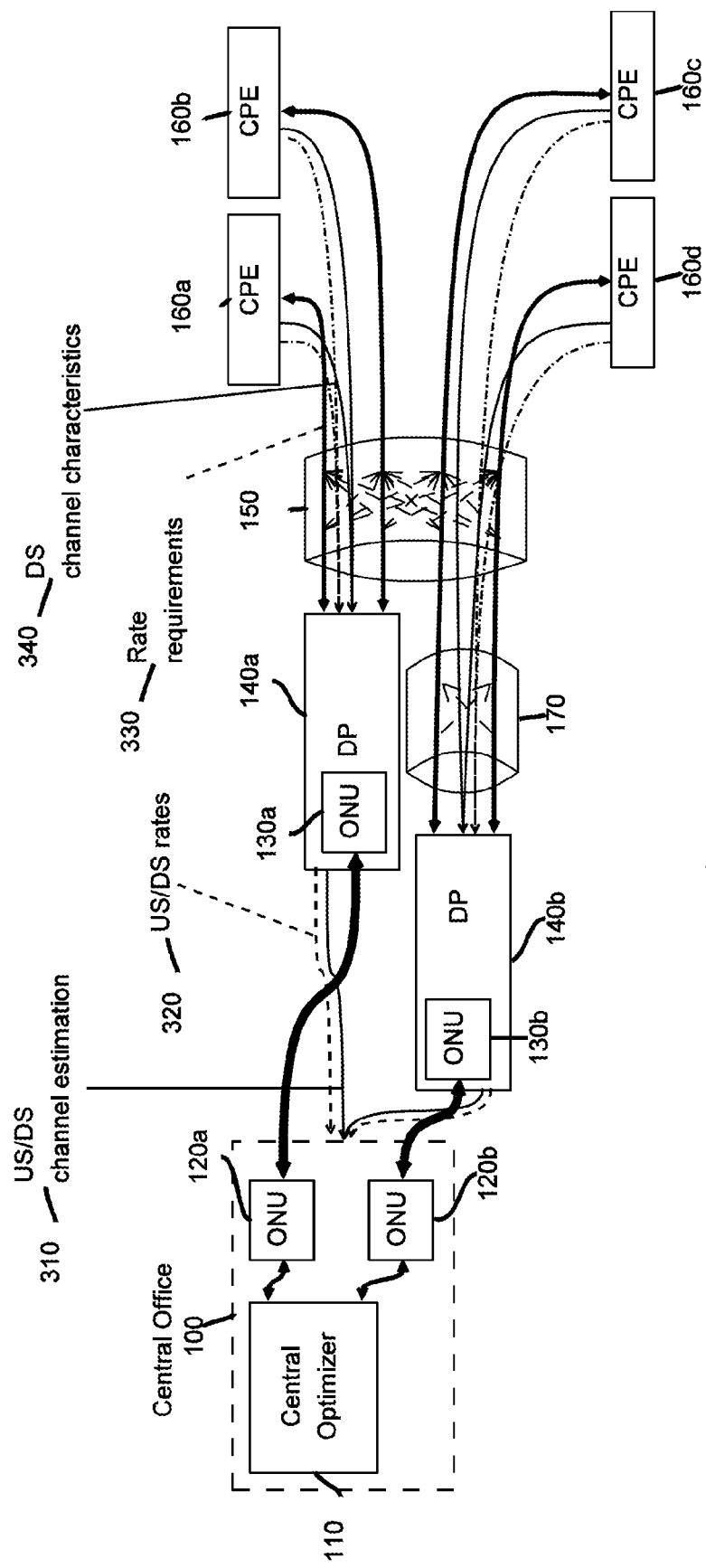
FIG. 3A illustrates one embodiment of a transmission communication system with multiple distribution points, including upstream and downstream channel estimations, upstream and downstream rate estimations, and downstream channel characteristics.
Figure 3B:
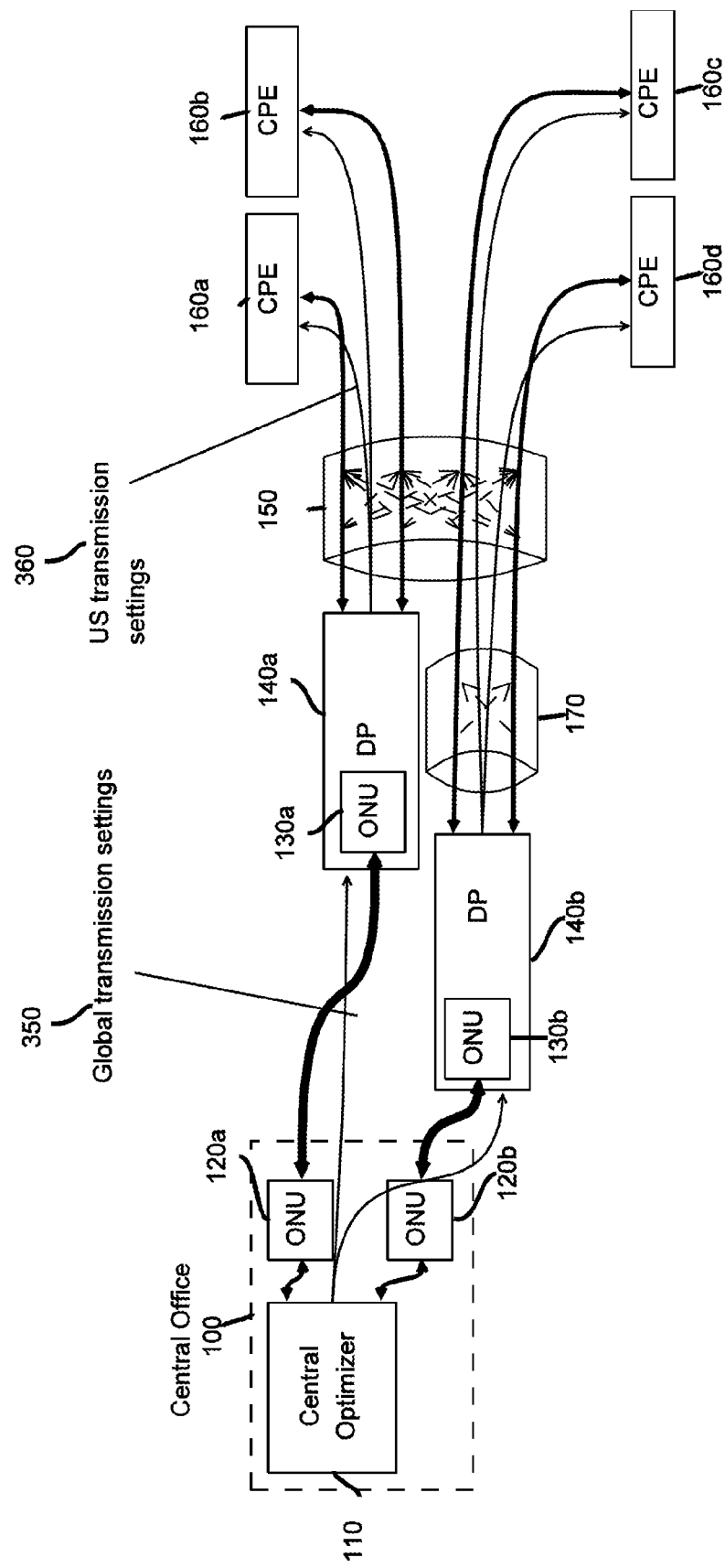
FIG. 3B illustrates one embodiment of a transmission communication system with multiple distribution points, including global transmission settings and upstream transmission settings.
Figure 3C:
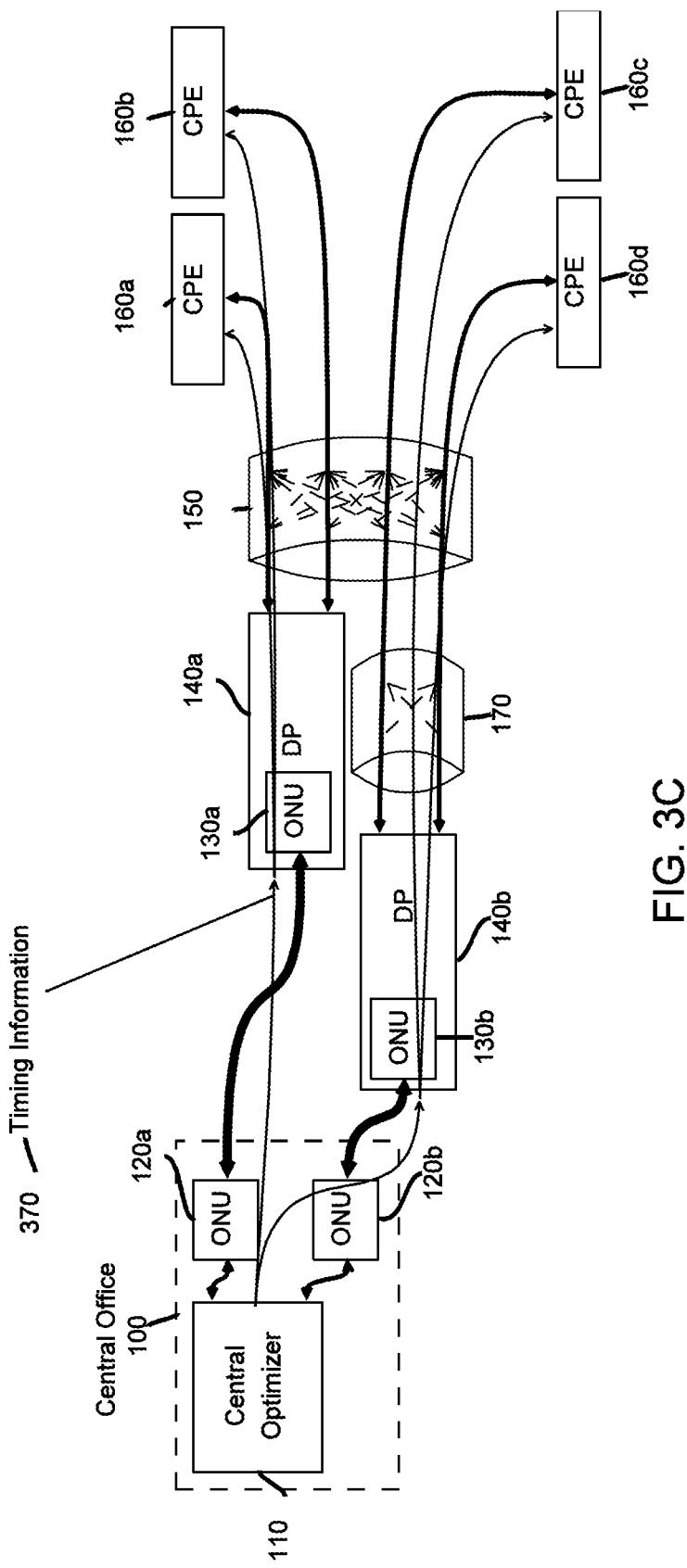
FIG. 3C illustrates one embodiment of a transmission communication system with multiple distribution points, including timing information.

FIGS. 3A, 3B, and 3C, show the information exchange for a system with central optimization over multiple distribution points. For crosstalk cancellation, within the distribution points, all transmit and receive signals must be available, to perform the vector pre-coding and equalization.

Generally, the spectrum optimization has two components. The outer optimization algorithm which adjusts the groups of lines transmitting at the same time and the share between uplink and downlink contained in the medium access plan. The medium access plan is optimized dynamically with respect to the rate requirements from the active connections. The information required to run the optimization are the actual link qualities which were achieved when all DPs use a specific configuration and the quality of service requirements from the subscribers.

The inner optimization adjusts the transmission settings and transmit spectrum, as well as the pre-coder and equalizer settings for a given configuration. Due to the slow channel time variances, these settings are adapted over time. The correction can be calculated based on channel estimation symbols or directly from the received data. Due to changes in the achieved data rates caused by the adaptation process, the link quality information for the central optimizer must be updated over time.

During initialization and line joining, the link rate information is not available. To identify the configurations to be used for transmission, the central optimizer must estimate the achievable quality of service based on a channel estimation, which is performed in multiple steps during initialization. The channel estimation information within the central optimizer is updated at every joining or initialization event and may also be updated continuously using channel estimation sequences.

Depending on the level of coordination, the data which is actually exchanged for channel estimation and for setting the transmission settings is different. Three different system setups are possible, which will be referenced as Setup A, Setup B, and Setup C. In addition, any combination of setups are allowed in various embodiments, including Setups A and B, B and C, A and C, or all of A and B and C.

FIG. 3A shows information flows with channel estimation data and rate requirements. The channel estimation is based on orthogonal sequences. The information that is required for Setup A is shown in 310, 320, 330, and 340. 310 is upstream and downstream channel estimation information which is conveyed from each DP 140*a* or 140*b*, over the ONU-ONU connection, to the central office 100, and particularly to the central optimizer 110 within the central office 100. 320 is upstream and downstream rate information which is also conveyed from each DP 140*a* or 140*b*, over the ONU-ONU connection, to the central office 100, and particularly to the central optimizer 110 within the central office 100. 330 are the rate requirements conveyed from each CPE over the DP to the central optimizer 340 are downstream channel characteristics which are conveyed from CPE transceivers 160*a*-160*d* inclusive, through the binder to the various DPs 140*a* and 140*b*, and then over the ONU-ONU connections to the central office 100, and particularly to the central optimizer 110 within the central office 100. The information to be collected and conveyed to the central optimizer 110 is collected and summarized in Table 3A below.

FIG. 3B shows information flows with transmission settings. 350 are global transmission settings, which are the power functions associated with transmissions by different devices within the system. Global transmission settings 350 are determined by the central optimizer 110, and are communicated from the CO 110 to the DPs 140*a* and 140*b*. On the basis of the global transmission settings 350, the DPs 140*a* and 140*b* communicate upstream transmission settings 360 to the CPE transceivers 160*a*-160*d* inclusive. The upstream transmission settings 360 are the transmission settings at which the CPE transceivers 160*a*-160*d* will transmit to the DPs 140*a* and 140*b*. The information to be collected and conveyed by the central optimizer 110 to the DPs 140*a* and 140*b*, and from the DPs 140*a* and 140*b* to the CPE transceivers 160*a*-160*d* inclusive.

FIG. 3C shows information flows for timing information. For this purpose, "timing settings" means time information 370 which is conveyed from the central optimizer to the DPs and CPE transceivers.

Depending on the type of setup Setup A with full coordination, Setup B with less coordination or Setup C with minimum coordination, not all of the information shown in FIG. 3A is required to be exchanged. Table 3A, Table 3B and Table 3C summarize the required information exchange for each setup.

In this Table 3A, as well as in Table 3B and Table 3B, the first column is the information that is communicated, the second column is the "source" which means the place from which the information is transmitted, the third column is the "destination" which means the places that receives the information, and fourth column indicates which Figure illustrates this particular information.

TABLE 3A

Information exchange for Setup A

| Information | Source | Destination | FIG. (and Elements) |
|---|---|---|---|
| Downstream Channel Estimation û of channel estimation symbols | CPE | Optimizer | 3A (310, 340) |
| Upstream Channel Estimation û of channel estimation symbols | DP | Optimizer | 3A (310) |
| Rate requirements | CPE | Optimizer | 3A (330) |
| Downstream Transmit PSD | Optimizer | DP | 3B (350) |
| Upstream Transmit PSD | Optimizer | CPE | 3B (360) |
| Downstream Pre-coder | Optimizer | DP | 3B (350) |

TABLE 3A-continued

Information exchange for Setup A

| Information | Source | Destination | FIG. (and Elements) |
|---|---|---|---|
| Upstream Equalizer | Optimizer | DP | 3B (350) |
| Downstream Equalizer | Optimizer | CPE | 3B (360) |
| Coding and Modulation (DS and US) | Optimizer | CPE/DP | 3B (350, 360) |
| Timing Information | Optimizer | CPE/DP | 3C (370) |

(Note:
"CPE" standards for "CPE transceiver".)

(Note:
Although this Table 3A mentions the "central optimizer", in alternative embodiments there is a "master optimizer" rather than a "central optimizer". Wherever the phrase "central optimizer" appears in the written description or claims, in alternative embodies the optimizer may be a "master optimizer" rather than a "central optimizer".)

The data exchange for Setup B is collected and summarized in Table 3B. This setup is considered to be a "DP coordination setup", which means that in Setup B there is a continuous information exchange between the DPs and the CPE transceivers. In this sense, "continuous information" means periodic but continuing information exchange. Such continuous information necessarily creates additional transmission overhead. Partly to offset this, the equalizer coefficients for downstream may also be computed and adapted at the CPE side, independent of the CO or DP. To choose coding, modulation and upstream transmit PSD correctly, the actual signal-to-noise ratio can be measured at the CPE transceiver and transmitted to the CO. The information that is required for Setup A is shown in 350 and 360.

TABLE 3B

Information exchange for Setup B

| Information | Source | Destination | FIG. (and Elements) |
|---|---|---|---|
| Downstream Channel Estimation û of channel estimation symbols | CPE | Optimizer | 3A (310, 340) |
| Upstream Channel Estimation û of channel estimation symbols | DP | Optimizer | 3A (310) |
| Downstream SNR | CPE | Optimizer | 3A (340) |
| Rate requirements | CPE | Optimizer | 3A (330) |
| Downstream Transmit PSD | Optimizer | DP | 3B (350) |
| Upstream Transmit PSD | Optimizer | CPE | 3B (360) |
| Downstream Pre-coder | Optimizer | DP | 3B (350) |
| Upstream Equalizer | Optimizer | DP | 3B (360) |
| Coding and Modulation (DS and US) | Optimizer | CPE/DP | 3B (350, 360) |
| Timing Information | Optimizer | CPE/DP | 3C (370) |

(Note:
"CPE" standards for "CPE transceiver".)

Setup C is considered to be a "minimum coordination setup", which means that in Setup C the system adapts all equalizers and pre-coders locally, whereas the central optimizer 110 controls only the timing settings that are required for inter-DP coordination. The information to be collected and conveyed by the central optimizer 110 to the DPs 140*a* and 140*b*, and from the DPs 140*a* and 140*b* to the CPE transceivers 160*a*-160*d* inclusive, is collected and summarized in Table 3C below.

TABLE 3C

Information exchange for Setup C

| Information | Source | Destination | FIG. (and Elements) |
|---|---|---|---|
| Downstream Channel Estimation û of channel estimation symbols | CPE | Optimizer | 3A (310, 340) |
| Inter-DP Downstream Channel estimation û | CPE | DP | 3A (310, 340) |
| Upstream Channel Estimation û of channel estimation symbols | DP | Optimizer | 3A (310) |
| Downstream SNR | CPE | DP/Optimizer | 3A (340) |
| Upstream SNR | DP | Optimizer | 3A (310) |
| Link Rates | DP | Optimizer | 3A (320) |
| Rate requirements | CPE | Optimizer | 3A (330) |
| Upstream Transmit PSD | DP | CPE | 3B (360) |
| Upstream Coding and Modulation | DP | CPE | 3B (360) |
| Timing Information | Optimizer | CPE/DP | 3C (370) |
| Power budget (DS and US) | Optimizer | DP | 3B (350, 360) |

(Note:
"CPE" standards for "CPE transceiver".)

Figure 4:
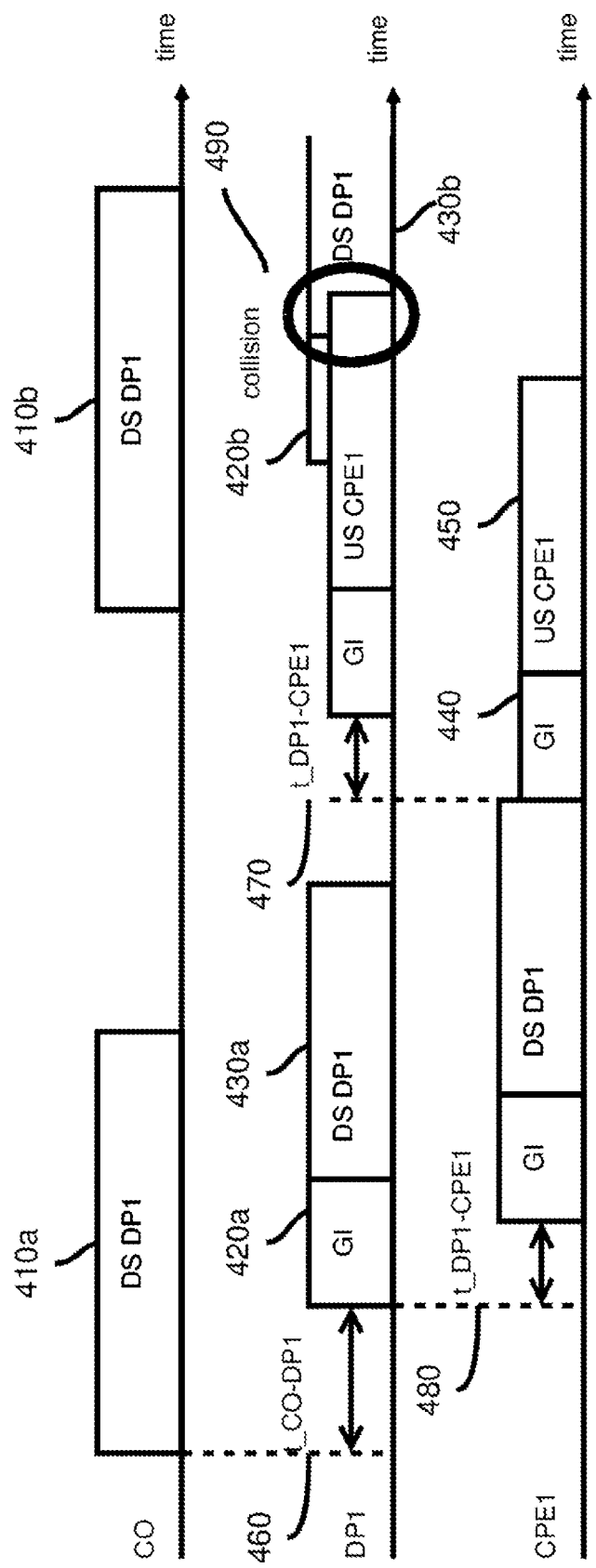
FIG. 4 illustrates one embodiment of a timing diagram for a synchronized TDD system without delay compensation.

FIG. 4 is a timing diagram for a synchronized TDD system that does not have delay compensation. FIG. 4 shows the positions of various data packets at different points of time, where the length of time is reflected on the x-axis. 410a is a data packet transmitted downstream from the central office to distribution point number one ("DP1"). 410b is a data packet transmitted downstream from the optimizer to DP1, where 410b is transmitted after transmission of 410a and after a time interval. 420a is a guard interval for a packet data transmission. 420b is also a guard interval for a packet data transmission. 430a is a data packet transmitted downstream from DP1 to CPE1, which thereby defines 420a as the guard interval for the data packet transmitted downstream from DP1 to CPE1 immediately prior to data packet 430a. 430b is a data packet transmitted downstream from DP1 to CPE1, immediately after packet 430a. This then means that 420b is the guard interval for data packet 430a. There are transmissions during guard intervals, but the length of transmission is less for guard intervals than for ordinary data packets. The data transmitted during a guard interval is the end of the prior data packet. For example, guard interval 420b is a transmission of the end of data packet 430a, just as guard interval 420a is a transmission of the end of the data packet immediately prior to data packet 430a. 440 is a guard interval for upstream data packet 450 from CPE1 to DP1.

After transmission begins for 410a, there is a time gap 460 until the transmission starts being received at DP1. The length of the time gap is related directly to the length of the physical channel between the optimizer and DP1. Similarly, there is a time gap 470 between the beginning of transmission of an upstream packet from CPE1 to DP1, where the length of 470 related directly to the length of the physical channel between CPE1 and DP1. Similarly, there is a time gap 480 between the beginning of transmission of a downstream packet from DP1 to CPE1. Note that 470 and 480 are of equal length, and the reason is that there is the same physical distance between DP1 and CPE1 whether measured by a downstream packet 480 or an upstream packet 470.

In the scenario illustrated in FIG. 4, there is a communication collision 490 between an upstream data packet and both guard interval 420b and downstream packet 430b. By definition, a "collision" is where there are downstream and upstream transmissions on the same line at the same time, which is reflected in 490. In this case, the collision continues from the beginning of guard interval 420b to the end of the US1 data packet located at DP1.

The main requirement for a setup with synchronized time division duplexing over multiple distribution points is a common symbol clock for all connections which are coupled by crosstalk between the physical transmissions. A common symbol clock means that the symbol frequency is exactly the same for each transmission.

The clock synchronization between and among distribution points is required to maintain the symbol alignment over time. If the clocks within distribution points run independently from one other, some distribution points may experience time variant crosstalk from other distribution points. Near-end crosstalk between uplink and downlink may, in particular, cause significant degradation in system performance. As shown in FIG. 4, additional alignment between uplink and downlink is required to avoid collisions between downlink and uplink, and also to avoid near-end crosstalk at points in time when the system switches between downlink and uplink.

As shown in FIG. 4, additional alignment between uplink and downlink may be required to use a guard interval efficiently when switching between uplink and downlink. The guard interval may create a high transmission overhead, and therefore, it should be as short as possible. In a multi-carrier system, such as DMT or OFDM, a guard interval may be chosen to match the longest impulse response length of the lines in a binder.

Figure 5:
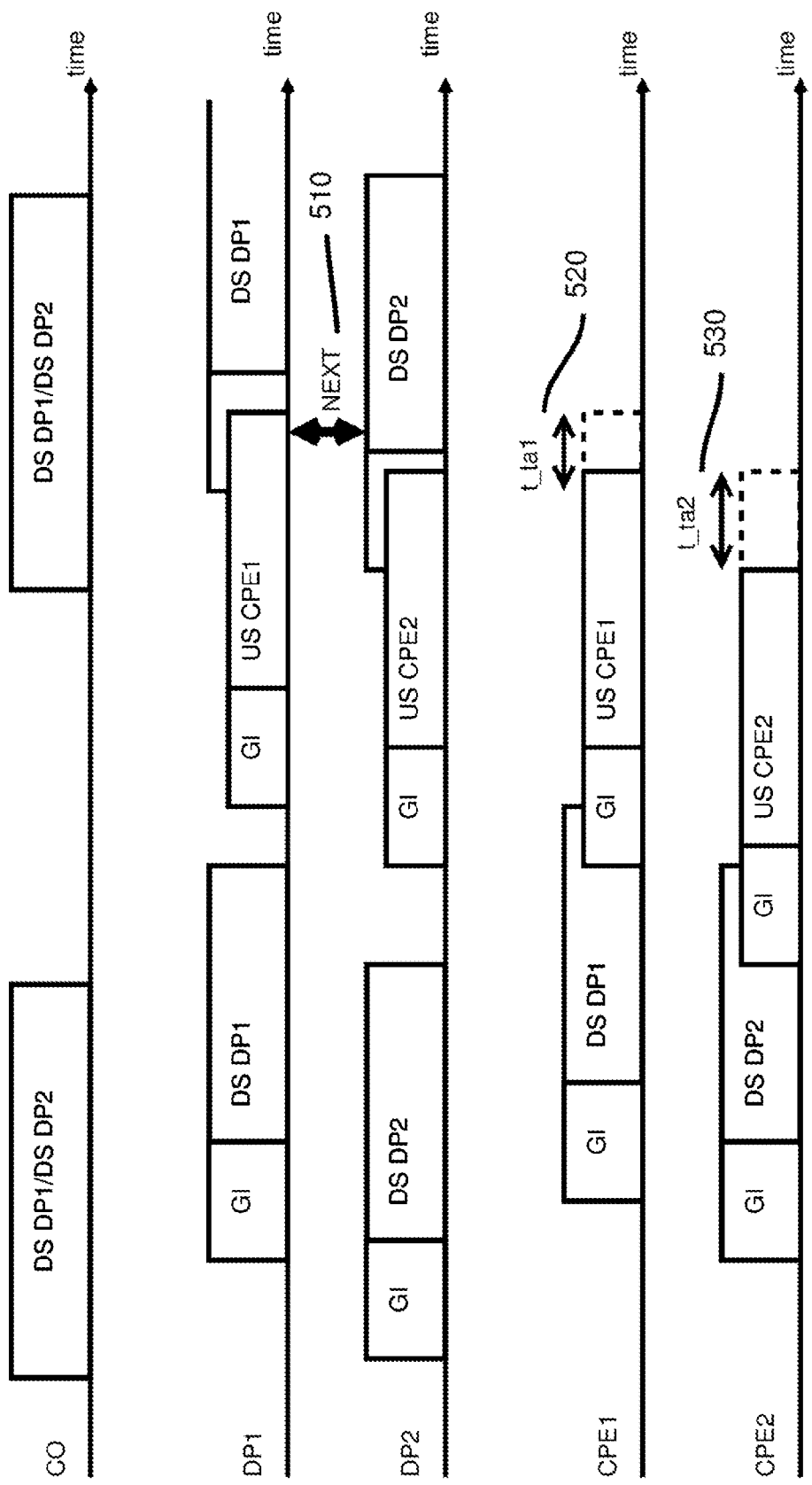
FIG. 5 illustrates one embodiment of a timing diagram for a synchronized TDD system with delay compensation between CPE devices and distribution points.

FIG. 5 is a timing diagram for a synchronized TDD system, like FIG. 4, except that in FIG. 5, there is delay compensation between CPE transceivers and DPs. To prevent or at least reduce time variant crosstalk, a symbol clock is generated within the central office 110 and transmitted to the distribution points 140a and 140b. With this kind of synchronization, the timing illustrated in FIG. 5 may be achieved to avoid the collision shown in FIG. 4. However, although FIG. 5 shows a solution to collision, it also shows the problem of near-end cross-talk.

In FIG. 5, 510 illustrates the problem of near-end crosstalk. Here, the upstream data packet US CPE1 is being transmitted through a line associated with DP1, and the same time that downstream packet DS DSP2 is being transmitted through a line associated with DP2. It is assumed that these two lines, one through DP1 and the second through DP2, share the same communication binder between the distribution points 140a and 140b and the CPE transceivers 160a-160d. This near-end crosstalk with begin at the start of packet DS DP2 on the right side of FIG. 5, to the end of packet US CPE1.

In FIG. 5, 520 is what is called a "timing advance" of the transmission of data packet US CPE1. The length of the advance is t_ta1. This advance is just long enough to eliminate the collision that formerly occurred in FIG. 4. 530 is the timing advance that might be applied to data packet US CPE2. The length of 530, which is t_ta2, is not the same as the length of 520, which is intended to reflect the possibility that the lengths of the physical channels are different from CPE2 to the DPs as compared to CPE1 to the DPs. Thus, as shown in FIG. 5, the signal paths from the central office 100 to the distribution points 140a and 140b are different and have therefore a different delay. Furthermore, the wires from the distribution points to the CPE transceivers are also of different lengths resulting in an additional delay spread. To have the transmissions synchronized such that a short guard interval can be used, an additional time shift may be necessary.

As the line length for which distribution points were used are typically short, often up to 200 m, the maximum delay spread may be less than the delay of the maximum length line, and therefore in many cases the influence of this delay can be ignored without significant performance loss. However, for cases where the delay is too high to be ignored, additional delay compensation is required. The first requirement for such compensation is that the uplink timings are synchronized at the CPE transceivers. This is also necessary for minimization of the guard intervals between uplink and downlink, and for an uplink vector equalizer to work efficiently. Therefore, a method similar to timing in advance in VDSL is assumed to be implemented on the system. This method will result in the timing shown in FIG. 5.

Although FIG. 5 shows a solution to the problem of communication collision, FIG. 5 also shows the problem of near-end crosstalk. This problem results, at least in part, from two distribution points, DP1 and DP2, transmitting with the same packet symbol clock, but due to different delays from central office to each DP (due to the different differences of the physical channels from CO to DP1 and CO to DP2, respectively), there is phase shift between the distribution points which still causes near-end cross talk.

Figure 6:
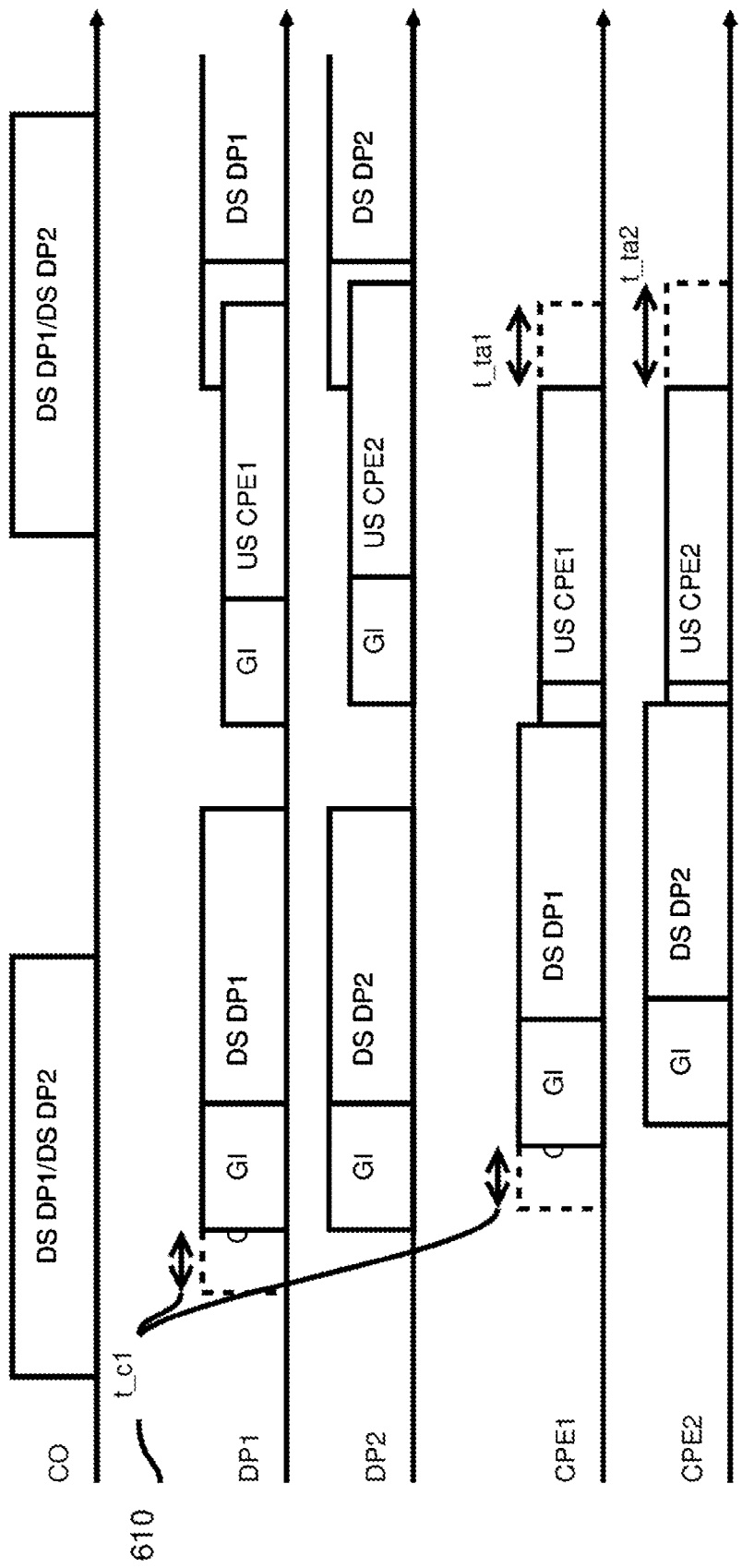
FIG. 6 illustrates one embodiment of an alternative timing diagram for a synchronized TDD system with delay compensation between CPE devices and distribution points.

FIG. 6 is a timing diagram for a synchronized TDD system, again, just as in FIG. 5, with delay compensation between CPE transceivers and DPs. That delay compensation, in FIG. 6 as in FIG. 5, solves the problem of communication collision by avoiding the collision. However, FIG. 6 also, unlike FIG. 5, shows a solution to the problem of near-end crosstalk.

In FIG. 6, 610 is a shifting of the beginning of transmission for DS DP1 at DP1. The amount of the timing advance, $t\_c1$, is just sufficient to insure that DP1 and DP2 begin transmitting downstream packets at the same point in time. By doing this in transmission of packet DS DP1, the downstream packets DP1 to CPE1 and DP2 to CPE2 will arrive at the CPEs at almost the same time. (They will not arrive at exactly the same time, because it is assumed, and likely true, that the lengths of the physical channels CPE1-DP1 and CPE2-DP2 are slightly different. In FIG. 6, the assumption is the channel CPE2-DP2 is just a bit longer than the channel CPE1-DP1, which causes DS DP2 to arrive just a very short time after DS DP1 arrives.) As a result in this change, upstream packet US CPE1 may be transmitted upstream a bit sooner than would otherwise have been true. This timing advance of US CPE1 results in no overlap between data packet US CPE1 and data packet DS DP2, hence no near-end crosstalk.

For timing advance, the transmit time for the uplink slot at CPE side of CPE i is shifted by an offset $t\_ta1$ 520 and or $t\_ta2$ 530, which is chosen to be the negative of the delay of signals between DP and CPE 480, as shown in the equation $t\_ta=-t\_DP\text{-}CPE$ where $t\_ta$ is the timing offset and $t\_DP\text{-}CPE$ is the delay of the line between distribution point and CPE. However, if the difference in delay between the optimizer and the different DPs is too high, causing crosstalk between different distribution points where the time difference is not covered by the guard interval, an additional delay compensation may be required to have the same transmit time at all distribution points. Then, not only a synchronized clock, but also alignment of the delays of the clock signals to the different distribution points will be required.

Therefore, the delay $t_{codp}$ is estimated by looping a signal from the central office 110 over the according distribution point back to the central office. This delay is estimated for every distribution point and then communicated to every distribution point. The DPs then shift the symbol clock which they receive from the central office according to this delay. Therefore, an existing time synchronization protocol, is used. This gives the timing according to FIG. 6.

Therefore, the delay of signals between central office and a distribution point $t\_CO\text{-}DP1$ (460) or $t\_CP\text{-}DP2$ (480) is estimated by looping a signal from the central office 100 over the according distribution point back to the central office 100. This delay is estimated for every distribution point and then communicated to every distribution point. The DPs then shift the symbol clock which they receive from the central office according to this delay. Therefore, an existing time synchronization protocol may be used. This gives the timing, according to FIG. 6.

Here, however, a time synchronization protocol has been used. The shift value $t\_c$, e.g. $t\_c1$ (610) for distribution point 1 is chosen with respect to an arbitrary reference delay, e.g., $t\_dpref$ according to the equation $t\_ci = t\_dpref - t\_CO\text{-}DPi$ where $t\_ci$ is the timing offset for the symbol clock of the distribution point i, $t\_dpref$ is a reference delay and $t\_CO\text{-}DPi$ is the delay for signals between central office and distribution point i.

With the synchronized and delay compensate signals illustrated in FIG. 5 and FIG. 6, it is possible to avoid collisions between uplink and downlink as well as near end crosstalk between distribution points. The remaining source of performance degradation is far end crosstalk between distribution points, which can be reduced by choosing the transmit spectrum and transmit time slots of each line such that the crosstalk is minimized, or by crosstalk cancellation between the distribution points. Both methods, that is, choosing spectrum and time slots, and crosstalk cancellation, require clock synchronization and delay compensation.

In one embodiment, there is a system for electronic communication. The system includes an optimizer, a plurality of distribution points ("DPs") in which each DP communicatively connected to the optimizer, a communication binder, two or more remote transceivers, and a plurality of communication lines between the distribution points and the remote transceivers. The communication lines are configured such that each DP is communicatively connected to at least one communication line, all lines run through the communication binder, all lines terminate at a remote transceiver, and each remote transceiver is communicatively connected to at least one line. The system is configured solve a communication problem associated with communication collision or crosstalk.

In a first alternative embodiment of the system just described, the optimizer is a central optimizer that is located within a central office, and the communication problem arises when a new distribution point with one or more new lines is added to the system.

In a first possible configuration of the alternative embodiment just described, the central optimizer performs time-sharing optimization by allocating transmission slots to the new lines, such that the allocated transmission slots were not in use prior to the addition of the new distribution point.

In a second possible configuration of the alternative embodiment just described, the central optimizer reviews data about transmissions and receptions prior to the addition of the new lines to the system, estimates where communication collisions will occur, and uses its estimates to prevent such communication collisions.

In one possible variation of the second possible configuration just described, collisions are avoided by the use of timing advances of one or more transmissions.

In a second possible variation of the second possible configuration just described, collisions are avoided by the use of synchronization of transmissions such that each of two or more transmitters transmit a transmission at substantially the same time.

In one possible configuration of the first alternative embodiment just described, the optimizer reviews data about transmissions and receptions prior to the addition of the new lines to the system, estimates where near-end crosstalk will occur, and uses its estimates to prevent such near-end crosstalk.

In one possible variation of the first possible configuration of the first alternative embodiment must described, near-end crosstalk is avoided by the use of timing advances of one or more transmissions.

In a second possible variation of the first possible configuration of the first alternative embodiment must described, near-end crosstalk is avoided by the use of synchronization of transmissions such that each of two or more transmitters transmit a transmission at substantially the same time.

In a third possible configuration of the first alternative embodiment just described, the master optimizer reviews data about transmissions and receptions prior to the addition of the new lines to the system, estimates where far-end crosstalk will occur, and uses its estimates to prevent such far-end crosstalk.

In a first possible variation of the third possible configuration of the first alternative embodiment just described, system avoids far-end crosstalk.

In a second possible variation of the third possible configuration of the first alternative embodiment just described, the system cancels far-end cross talk.

In a second alternative embodiment of the system described above, the optimizer is a is a master optimizer that is located within one of the distribution points, and the communication problem arises when a new distribution point with one or more new lines is added to the system.

In a first possible configuration of the second alternative embodiment just described, the master optimizer performs timesharing optimization by allocating transmission slots to the new lines, such that the allocated transmission slots were not in use prior to the addition of the new distribution point.

In a second possible configuration of the second alternative embodiment just described, the master optimizer reviews data about transmissions and receptions prior to the addition of the new lines to the system, estimates where communication collisions will occur, and uses its estimates to prevent such communication collisions.

In one possible variation of the second possible configuration just described, collisions are avoided by the use of timing advances of one or more transmissions.

In a second possible variation of the second possible configuration just described, collisions are avoided by the use of synchronization of transmissions such that each of two or more transmitters transmit a transmission at substantially the same time.

In one possible configuration of the second alternative embodiment just described, the optimizer reviews data about transmissions and receptions prior to the addition of the new lines to the system, estimates where near-end crosstalk will occur, and uses its estimates to prevent such near-end crosstalk.

In one possible variation of the first possible configuration of the second alternative embodiment must described, near-end crosstalk is avoided by the use of timing advances of one or more transmissions.

In a second possible variation of the first possible configuration of the second alternative embodiment must described, near-end crosstalk is avoided by the use of synchronization of transmissions such that each of two or more transmitters transmit a transmission at substantially the same time.

In a third possible configuration of the second alternative embodiment just described, the master optimizer reviews data about transmissions and receptions prior to the addition of the new lines to the system, estimates where far-end crosstalk will occur, and uses its estimates to prevent such far-end crosstalk.

In a first possible variation of the third possible configuration of the second alternative embodiment just described, the system avoids far-end crosstalk.

In a second possible variation of the third possible configuration of the second alternative embodiment just described, the system cancels far-end cross talk.

Figure 7:
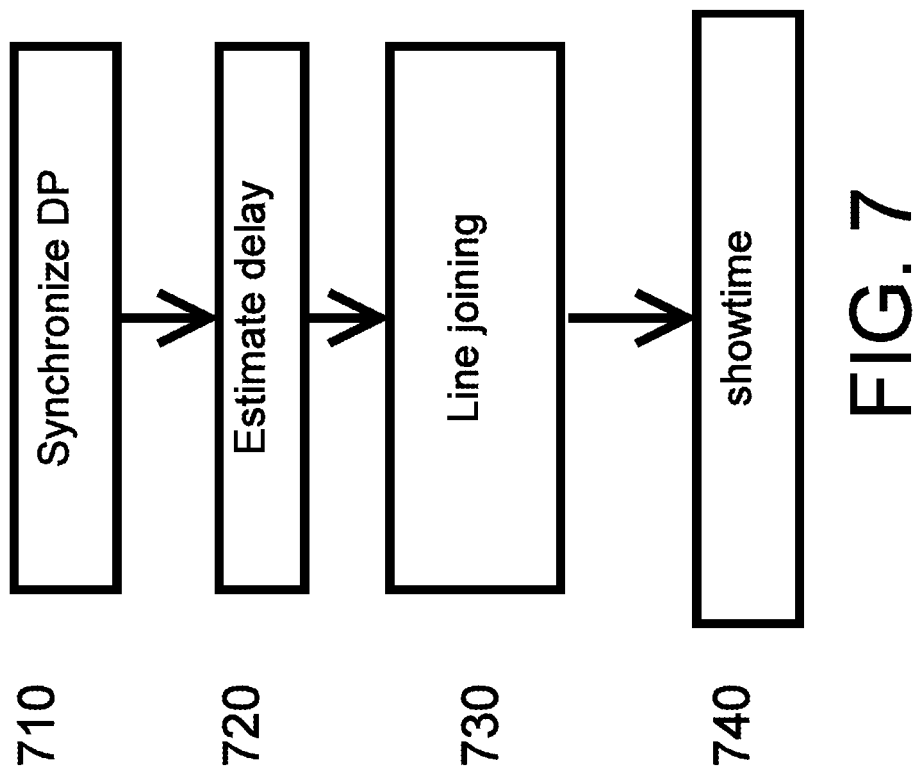
FIG. 7 illustrates one embodiment of a method for setting up an active communication system, and particularly for bringing communication lines into an active mode.

FIG. 7 illustrates one embodiment of a method for setting up an active communication system, and particularly, for bringing communication lines into an active mode. The setting up includes both the initialization of a DP, which may be an entirely new DP or a DP that is going back on-line, and the joining of new lines. In 710, the clock of the DP to be added is synchronized with the other clocks in the system. In 720, the central optimizer estimates the additional communication delay that will be caused by the addition of the lines running through the DP to be added. In 730, the DP is added to the active system, and the lines in the DP are joined to active system. In 740, initialization has been completed, and the state of active data transmission begins including added DP and all of the communication lines running through the added DP.

When a DP starts up, the clock synchronization and estimation of the delay must take place before the first link starts to transmit. After timing synchronization of the initializing distribution point, the joining of the connected lines is performed. As illustrated in FIG. 7, the joining process is used to bring the lines associated with the added DP into active mode.

One embodiment is a method for synchronizing communication in an electronic communication system. In one step, an optimizer creates a common clock for multiple distribution points ("DPs") sharing a communication binder. In another step, the optimizer estimates time delays of a communication path from a central unit to the DPs. In another step, the optimizer uses the estimated time delays to align symbol timing of transmissions to and from the DPs.

In an alternative embodiment of the method just described, the optimizer estimates timing advances to align timing of upstream transmissions in the system with timing of downstream transmissions in the system.

In one possible configuration of the alternative embodiment just described, the optimizer is a central optimizer located at a central office.

In one possible variation of the first possible configuration just described, the central optimizer uses the estimated time delays and estimated timing advances to avoid communication collisions in the system.

In a second possible variation of the first possible configuration just described, the central optimizer uses the estimated time delays and estimated timing advances to avoid near-end crosstalk in the system.

In a third possible variation of the first possible configuration just described, the system applies far-end crosstalk cancellation techniques to compensate for far-end crosstalk.

In a second possible configuration of the alternative embodiment just described, the optimizer is a master optimizer located at one of the distribution points.

In a first possible variation of the second possible configuration of the alternative embodiment, the master optimizer uses the estimated time delays and estimated timing advances to avoid communication collisions in the system.

In a second possible variation of the second possible configuration of the alternative embodiment, the master optimizer uses the estimated time delays and estimated timing advances to avoid near-end crosstalk in the system.

In a third possible variation of the second possible configuration of the alternative embodiment, the system applies far-end crosstalk cancellation techniques to compensate for far-end crosstalk.

Figure 8:
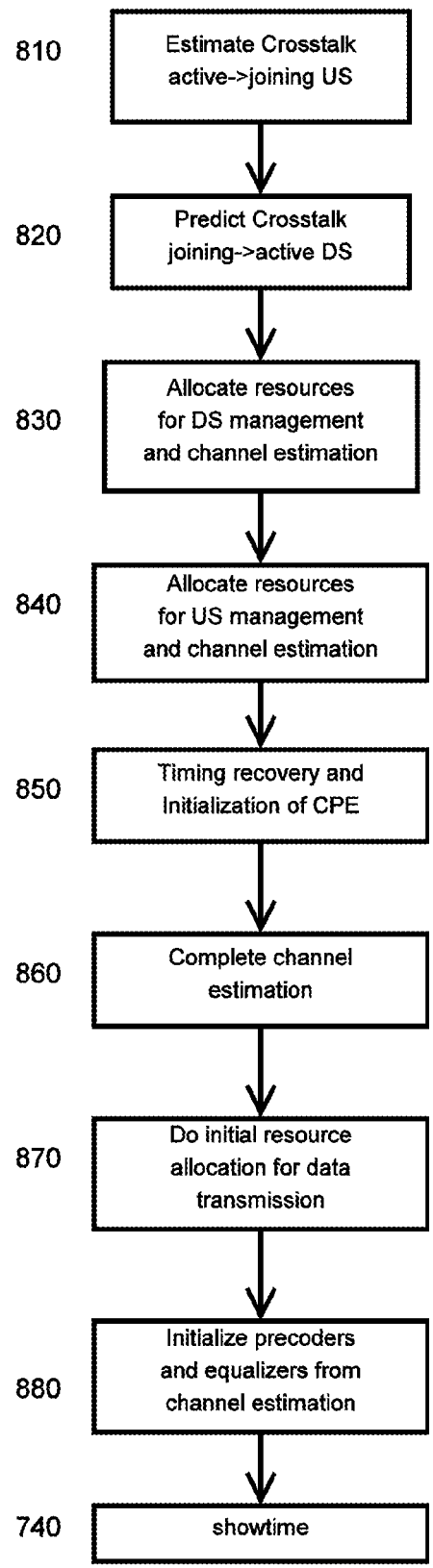
FIG. 8 illustrates one embodiment of a method for line joining.

FIG. 8 is an illustration of the process of line joining. FIG. 8 is a more detailed illustrated of the steps presented in FIG. 7 as steps 730 and 740. FIG. 8 shows one embodiment for adding more lines to an active communication system that includes multiple distribution points and multiple CPE transceivers.

In 810, the crosstalk couplings from the active lines to the joining lines $H_{us\ j \leftarrow a}$ for the upstream can be estimated at the distribution point without transmitting into the joining line and therefore without creating interference. Based on this estimate from 810, in 820, a coarse estimate of the crosstalk couplings from the joining lines to the active lines of the downstream channel $H_{ds\ a \leftarrow j}$ is possible. For all passive components, crosstalk on the upstream is equal to crosstalk on the downstream, due to reciprocity. Hence, $H_{ds\ j \leftarrow a} = H_{us\ a \leftarrow j}$.

In 830, the resources for a management channel and for transmission of channel estimation symbols will be allocated such that no unexpected interference is caused for the active lines. For the downstream management channel, there is an estimation of the crosstalk channels from the joining lines to the active lines available. Therefore, the method of increasing robustness of the active lines may be applied. For the upstream management channel, there is no information available and therefore the use of a separate time slot may be more suitable. The management channel and training sequences for downstream are started before the upstream direction. This is necessary because the CPE needs to recover the symbol clock for upstream based on the reception of downstream training signals. Furthermore, the timing information for the upstream channel, defining the time when the joining lines are allowed to transmit upstream and to receive downstream, is communicated via the downstream management channel.

After 830, in 840, resources are allocated for upstream management and channel estimation. Then timing recovery is estimated and CPE transceivers are initialized 850. When management channels and training sequences are available for downstream and upstream, a complete channel estimation can be performed in 860. Based on the complete channel estimation in 860, the central optimizer is able to reallocate resources for data transmission to and from active lines 870, and to initialize pre-coders and equalizers from the channel estimation 880. Finally, after initialization of pre-coders and equalizes 880 has been completed, the state of active data transmission begins 740 including added DP and all of the communication lines running through the added DP.

Whenever new lines join the system, the direct path and crosstalk channels from the joining lines to the active lines and vice versa must be estimated in order to run the resource allocation and select proper transmission settings.

The key requirement for the joining process is that the active transmissions do not experience unexpected interference from the joining lines. Such interference could cause communication instabilities.

One method to avoid unexpected interference from joining lines is the use of time slots which were not used for active transmissions during joining. Since the system may use all the available transmission time for active transmissions, the central optimizer must change timing information to allocate time slots for line activation.

An alternative or additional method is to estimate the performance degradation caused by interference from the joining lines before starting the joining process. In this case, the active lines transmission settings can be changed such that the interference from joining lines does not cause instabilities.

The first method, use of separate time slots for line joining, does not require channel estimation and is therefore more robust than the second method. However, the first method may also reduce the available data rates of active lines more than changing the transmission settings of the active lines, as provided in the second method. The following table illustrates some advantages and disadvantages of these two methods.

| Method | Advantage(s) | Disadvantage(s) |
| --- | --- | --- |
| Use Time Slots | 1. Channel estimation not required. 2. More robust. | 1. Reduced data rates of active lines. |
| Change Transmission Settings | 1. Higher data rates of active lines. | 1. Channel estimation is required. 2. Less robust. |

One embodiment is a method for initializing an added distribution point in an electronic communication system. In one step, the system allocates resources for downstream management, upstream management, and channel estimation. In another step, the system performs line training for data transmissions. In another step, the system initializers pre-coders and equalizers from channel estimation.

In a first alternative embodiment of the method just described, the method is implemented by a central optimizer located at a central office in the communication system.

In a first possible configuration of the first alternative embodiment just described, the allocating of resources for downstream management, upstream management, and channel estimation, includes (a) estimating collisions and crosstalk from actively joining upstream transmissions resulting from the addition of communication lines within the added distribution point, (b) predicting collisions and crosstalk from actively joining downstream transmissions resulting from the addition of communication lines within the added distribution point, (c) allocating resources for downstream management and channel estimation, and (d) allocating resources for upstream management and channel estimation.

In a possible variation of the first possible configuration just described, the training of lines for data transmission includes (a) performing timing recovery and initialization of CPE transceivers included as part of the system, (b) completing channel estimation, and (c) performing initial resource allocation for data transmission.

In one possible implementation of the first variation just described, the method is implemented to avoid one or more collisions.

In a second possible implementation of the first variation just described, the method is implemented to avoid near-end crosstalk.

In a third possible implementation of the first variation just described, the method is implemented to avoid or cancel far-end crosstalk.

In a second alternative embodiment of the method described above, the method is implemented by a master optimizer located at a distribution point in the communication system.

In a first possible configuration of the second alternative embodiment just described, the allocating of resources for downstream management, upstream management, and channel estimation, includes (a) estimating collisions and crosstalk from actively joining upstream transmissions resulting from the addition of communication lines within the added distribution point, (b) predicting collisions and crosstalk from actively joining downstream transmissions resulting from the addition of communication lines within the added distribution point, (c) allocating resources for downstream management and channel estimation, and (d) allocating resources for upstream management and channel estimation.

In a possible variation of the first possible configuration just described, the training of lines for data transmission includes (a) performing timing recovery and initialization of CPE transceivers included as part of the system, (b) completing channel estimation, and (c) performing initial resource allocation for data transmission.

In one possible implementation of the first variation just described, the method is implemented to avoid one or more collisions.

In a second possible implementation of the first variation just described, the method is implemented to avoid near-end crosstalk.

In a third possible implementation of the first variation just described, the method is implemented to avoid or cancel far-end crosstalk.

The invention claimed is:

1. A method of synchronizing communication in an electronic communication system with a central unit and multiple distribution points sharing a communication binder, the communication system further comprising a plurality of Customer Premises Equipment (CPE), transceivers, the method comprising:
   creating a common clock for the multiple distribution points;
   estimating respective time delays of respective communication paths from the central unit to respective distribution points and from distribution points to respective CPE transceivers; and
   using the estimated time delays to determine respective timing advances for the respective distribution points and respective CPE transceivers;
   causing the respective distribution points to align symbol timing of downlink transmissions from the distribution points to the CPE transceivers based at least on the respective timing advances,
   causing CPE transceivers to align symbol timing of uplink transmissions from the CPE transceivers to the distribution points based at least on the timing advances,
   thereby using the estimated time delays to avoid communication collisions in the system between the downlink transmissions and the uplink transmissions.

2. The method of any of claim 1, further comprising:
   using the estimated time delays or estimated timing advances to avoid near-end crosstalk in the system.

3. The method of claim 1, further comprising:
   applying far-end crosstalk cancellation techniques to compensate for far-end crosstalk.

4. A method for adding an added distribution point in an electronic communication system with a central unit and multiple distribution points, said method comprising:
   allocating resources in the added distribution point for downstream management, upstream management, and channel estimation;
   training of lines connected to the added distribution point for data transmission; and
   initializing pre-coders and equalizers in the distribution point from channel estimation;
wherein allocating of resources for downstream management, upstream management and channel estimation comprises:
   estimating collisions and crosstalk from actively joining upstream transmissions resulting from the addition of communication lines within the added distribution point;
   predicting collisions and crosstalk from actively joining downstream transmissions resulting from the addition of communication lines within the added distribution point;
   allocating resources for downstream management and channel estimation; and
   allocating resources for upstream management and channel estimation.

5. The method of claim 4, wherein the training of lines for data transmission comprises:
   performing timing recovery and initialization of CPE transceivers included as part of the system;
   completing channel estimation; and
   performing initial resource allocation for data transmission.

6. A system for electronic communication, comprising:
   an optimizer;
   a plurality of distribution points, each of the plurality of distribution points communicatively connected to the optimizer;
   a communication binder;
   a plurality of remote transceivers; and
   a plurality of communication lines between the distribution points and the remote transceivers, configured such that each distribution point is communicatively connected to at least one communication line, all lines run through the communication binder, all lines terminate at a remote transceiver, and each remote transceiver is communicatively connected to at least one line;
   wherein the optimizer is configured to estimate time delays of the communication lines and to use the respective estimated time delays as respective timing advances to align symbol timing of downlink transmission from the plurality of distribution points and to the plurality of remote transceivers at the distribution points and of uplink transmission from the plurality of remote transceivers to the plurality of distribution points at the remote transceivers to avoid communication collisions in the system between the uplink transmission and the downlink transmission.

7. An optimizer for use in the system of claim 6, the optimizer adapted for communicative connection to a plurality of distribution points, wherein the optimizer is at least one of:
   a central optimizer configured for location at a central office, or
   a master optimizer configured for location at a distribution point, wherein the optimizer is configured to perform:
creating a common clock for the plurality of distribution points;
estimating time delays of a communication path from a central unit to the distribution points; and
using the estimated time delays to align symbol timing of transmissions to and from the distribution points,
using the estimated time delays or estimated timing advances to avoid communication collisions in the system between upstream and downstream.

8. The optimizer of claim 7, the optimizer to avoid collisions and being adapted to use at least one of:
timing advances of one or more transmissions; or
synchronization of transmissions such that each of two or more transmitters transmit a transmission at substantially the same time.

9. The optimizer of claim 7, the optimizer to perform timesharing optimization and being adapted to allocate transmission slots to the new lines, such that the allocated transmission slots were not in use prior to the addition of the new distribution point.

10. The optimizer of claim 9, the optimizer to avoid near-end crosstalk and further being adapted to use at least one of:
review of data about transmissions and receptions prior to the addition of the new lines to the system; or
estimate where near-end crosstalk will occur, and use the estimates to prevent such near-end.

11. The optimizer of claim 10, the optimizer to avoid far-end crosstalk and further being adapted to use at least one of:
estimate where far-end crosstalk will occur, and uses its estimates to prevent such far-end crosstalk; or
cancel far-end cross talk.

12. The optimizer of claim 7, wherein the optimizer is configured to further perform:
estimating the timing advances to align timing of upstream transmissions in the system with timing of downstream transmissions in the system.

13. The optimizer of claim 7, wherein the optimizer is configured to further perform:
applying far-end crosstalk cancellation techniques to compensate for far-end crosstalk.

14. The optimizer of claim 7, wherein the optimizer is configured to further perform:
allocating resources in an added distribution point for downstream management, upstream management, and channel estimation;
training of lines connected to the added distribution point for data transmission; and
initializing pre-coders and equalizers in at least one distribution point from channel estimation.

15. The optimizer of claim 7, wherein the optimizer is configured to further perform:
using the estimated time delays or estimated timing advances to avoid near-end crosstalk in the system.

* * * * *